United States Patent Office 3,265,759
Patented August 9, 1966

3,265,759
POLYMERIZATION PROCESS USING DISPERSED SODIUM
Alfred R. Cain, Akron, Ohio, assignor to The Firestone Tire & Rubber Company, Akron, Ohio, a corporation of Ohio
No drawing. Filed Apr. 25, 1963, Ser. No. 275,522
3 Claims. (Cl. 260—683.15)

This invention relates to an improved method of preparing a sodium activator and using the same in the polymerization of propylene and other olefin and diene monomers. Such olefins include, for example, ethylene and styrene, and the dienes include, for instance, butadiene and isoprene. The sodium activator is also suitable for the polymerization of mixtures of such monomers.

Sodium is recognized as a valuable activator in a variety of catalyst combinations used in polymerization reactions. Although the invention will be described more particularly in connection with a known catalyst system which includes a silane and a titanium-aluminum derivative in addition to the sodium, it is not limited thereto but includes any catalyst system which utilizes sodium dispersed in a hydrocarbon.

According to this invention, the sodium is supplied to the system dispersed in a mixture of a light mineral oil and petrolatum. A blend containing too much petrolatum presents handling difficulties. A blend of 25 to 75 percent (by weight) of petrolatum and 75 to 25 percent of light mineral oil is used, such, for instance, as a blend of 70 percent petrolatum and 30 percent light mineral oil, or a 50%–50% blend of the two, or a blend of about 25 percent petrolatum in 75 percent of light mineral oil, which latter will generally be preferred from a cost standpoint, although the equipment employed may make it desirable to utilize some other blend of a particular viscosity.

Dispersing sodium in such a blend of petroleum oil and petrolatum at a temperature above the melting point of sodium, using any usual good dispersing equipment, the particle size of the sodium is readily reduced to the range of about 2 to 100 microns, or perhaps 2 to 50, or even 2 to 20 microns, the smaller particle sizes being generally preferred. Not only does the blend make sodium of fine particle size readily available, but the blend is essentially inert chemically and does not poison other catalyst components—a difficulty encountered with many dispersing agents. For example, the catalyst component known as AA is not effected by a petrolatum-mineral oil blend, whereas it is poisoned by certain dispersing agents of the prior art. The system is more active with such a sodium dispersion as disclosed herein, particularly when dispersed in small particles, than when dispersed in a medium containing a dispersing agent which poisons one or more of the catalyst components. The system must be free of sulfur, oxygen, sulfur dioxide, carbonyl groups, and reactive hydrogen. It must be anhydrous.

The catalyst component known as AA is prepared by heating titanium tetrachloride with metallic aluminum at a moderately elevated temperature of the order of 90° C., in approximately the ratio of 3 mols of titanium chloride to 1 gram-atom of aluminum metal. The reaction product has the empirical formula $Ti_3AlCl_{12}$, and appears to be a true compound of all of these elements, since any excess of titanium tetrachloride may be leached therefrom down to, but not beyond, the composition of the formula given. This simple reaction product is activated by intensive grinding as in a ball mill, edge runner, roll mill, disc mill, impact mill or the like. This grinding out only reduces the particle size of the titanium chloride, but seems to develop some catalytically active, strained crystal defect areas. Such material is sold by Stauffer Chemical Company, and is known in the industry as AA.

The constituents of petrolatum have an average molecular weight of about 500 to 900, the average number of carbon atoms in the constituents being about 45 to 50. The content of paraffins is usually better than 80 percent, and several percent, e.g., 3 to 6 percent of aromatics are usually present. The naphthene content is variable from about 1 to 15 percent, generally averaging about 6 percent in a commercial grade of petrolatum which has been used satisfactorily in carrying out the process.

Table I which follows records the properties of various blends which have been used satisfactorily. The readings recorded were obtained on a Brookfield Synchro-Lectric Viscometer, Model No. LVF, at room temperature, using 60 r.p.m., and the different spindles indicated. The compositions are there identified by code numbers which are explained here. Petrolatum A, known commercially as Esso Light Amber Perolatum, gave the following analysis:

|  | Percent |
|---|---|
| Paraffins | 91 |
| Naphthenes | 6 |
| Aromatics | 3 |

Average carbon number ca 47.

Petrolatum B was the product known as Vaseline, which is of substantially the foregoing chemical composition, and similar to the product known commercially as white petroleum jelly, U.S.P. Two different grades of mineral oil were used as follows: mineral oil A was SOHITEK 70 which gave the following analysis:

| Specific gravity at 60° F. | .835 to .850 |
|---|---|
| Flash point | 355° F. |
| Pour point | 30° F. |
| Viscosity at 100° F. | 65 to 75 |

Mineral oil B was that known as "Mineral Spirits," a high-boiling kerosene of the following composition:

| Specific gravity at 60° F. | .786 |
|---|---|
| Distillation range | 364 to 394° F. |
| Flash point | 141° F. |
| Aromatics | 11.0 |

The different compositions were anhydrous and free from entrapped air.

TABLE I
VISCOSITIES

| Test Material | Spindle No. | Reading | Cps. |
|---|---|---|---|
| Mineral Oil A | 1 | 17.1 | 17.1 |
| Mineral Oil B | 1 | 2.9 | 2.9 |
| High Boiling Kerosene | 1 | 55.8 | 55.8 |
| Mineral Oil A Plus Petrolatum B (50–50) | 4 | 25.7 | 2,570 |
| Mineral Oil A Plus Petrolatum B (25–75) | 4 | 55.9 | 5,590 |
| Mineral Oil B Plus Petrolatum A (50–50) | 2 | 16.0 | 80 |
| Mineral Oil B Plus Petrolatum A (75–25) | 2 | 5.5 | 27.5 |

The foregoing blends are representative of those which may be used. The viscosity of the blend used will depend upon the equipment used, which may be, for example, a Cowles agitator, a Manton-Gaulin Homogenizer or equipment utilizing ultra-sonic agitation.

The following description of methods of preparing sodium dispersion are typical; however, it is realized that there are other mechanical means of producing small particle-size sodium dispersion.

Method I.—Seven and eight-tenths pounds of mineral oil A, 3.35 pounds of petrolatum B, and 6.0 pounds of sodium metal (35 percent) were placed in a 3-gal. reactor under a pure nitrogen purge. The reactor was heated to 105° C. at which time agitation with a high shear agitator was slowly started. When the temperature of the reactor reached 125° C. agitation was slowly increased to 17,000 r.p.m. High speed agitation was maintained for 15 minutes at 125° C. The reactor was cooled to 110° C. before stopping agitation. The particle size of the dispersion was between 5–10 microns.

Sodium dispersion of the type described in Method I was used in Examples 1, 2, 3, 4, 5, 6 and 7.

*Method II.*—Ninety-nine pounds of mineral oil B, 99 pounds of petrolatum A and 73.0 pounds of sodium metal (27 percent) were charged to a 75-gal. reactor. The reactor was closed and purged with pure nitrogen. The oil content of the vessel was slowly agitated with a high shear impellor while heating to 125° C. At this temperature, the rate of agitation was increased slowly to 10,000 r.p.m. After ten minutes of high speed agitation, the sodium metal was reduced to particles of 50–100 microns in size, normally referred to as sodium sand.

The sodium sand was then recycled through a preheated high shear Manton-Gaulin homogenizer until the particle size had been reduced to 1–5 microns. The contents of the reactor were cooled to room temperature.

Sodium dispersions of the type described in Method II were used in Examples 11, 12, 13 and 14.

In preparing the dispersion, the weight of the sodium may be 5 to 100 percent of the weight of the blend.

The advantage of dispersing the sodium in a blend of petrolatum and light mineral oil is illustrated by the following examples.

*Examples 1 and 2*

The following experiments were performed in 28-oz. bottles that had been baked at 105° C. and purged with hydrogen gas and then capped with rubber liners. Five hundred ml. of heptane was pressured into each bottle, followed by pressuring propylene in from a cylinder until approximately 50 grams of propylene was dissolved in the heptane. The contents of the bottles were then catalyzed by injecting the amounts of catalyst given in millimoles (mM.) in Table II. A 35-percent sodium dispersion was prepared in a 70/30 mineral oil A/petrolatum B blend and then diluted to 2M (molar) in mineral oil for ease of measuring. The polymerization was carried out at 50° C.

TABLE II

| Example | mM. $H_2$ | mM. AA | mM. Na | Initial, p.s.i.g. | 17 Hr., p.s.i.g. |
|---|---|---|---|---|---|
| 1 | 20 | 4.0 | 3.5 | 55 | 0 |
| 2 | 20 | 4.0 | 3.5 | 55 | 0 |

The pressure drops shown in Table II, 17 hours after the polymerization was begun, indicate polymerization, and the rate of drop shows that the polymerization went forward at a very satisfactory rate.

*Examples 3, 4, 5 and 6*

In the following examples the bottles were prepared in the same manner as above; with the exception that the bottles were purged with lamp grade nitrogen. In these experiments TDSI—tetrakis(dimethylamino)silane—and diethylzinc were used as additional modifiers of the propylene polymerization. The progress of the polymerization is indicated by the given pressure drops at 15 and 32 hours, respectively, after the start of the polymerization, as shown in Table III. The final pressures shown in Table III are not quite as low as those in Table II because the nitrogen is not consumed in the polymerization.

TABLE III

| Example | mM. $H_2$ | mM. AA | mM. TDSI | mM. Na | mM. $Et_2Zn$ | Initial, p.s.i.g. | 15 Hr., p.s.i.g. | 32 Hr., p.s.i.g. |
|---|---|---|---|---|---|---|---|---|
| 3 | 4.0 | 4.0 | 1.0 | 4.5 | 0.05 | 55 | 16 | 7 |
| 4 | 4.0 | 4.0 | 1.0 | 4.5 | 0.05 | 55 | 13 | 7 |
| 5 | 4.0 | 4.0 | 1.0 | 4.5 | 0.05 | 55 | 17 | 7 |
| 6 | 4.0 | 4.0 | 1.0 | 4.5 | 0.05 | 55 | 15 | 7 |

*Examples 7, 8, 9 and 10*

For comparison the following experiments on the polymerization of propylene were made using commercially available sodium dispersions. The bottle loading procedure for Examples 7, 8, 9 and 10 was the same as described for Examples 3, 4, 5 and 6. The sodium used in Examples 7 and 8 was a commercial dispersion in a paraffin cake, which first had to be dissolved in a hydrocarbon solvent for ease of handling.

The sodium suspension used in Examples 9 and 10 was a commercial mineral oil dispersion stabilized with aluminum stearate. This was also diluted in mineral oil for ease of handling.

The pressure drops shown in Table IV indicate that these dispersions are not as active as the dispersion prepared with mineral oil and petrolatum.

TABLE IV

| Example | mM. $H_2$ | mM. AA | mM. TDSI | mM. Na | mM. $Et_2Zn$ | Initial, p.s.i.g. | 15 Hr., p.s.i.g. | 32 Hr., p.s.i.g. |
|---|---|---|---|---|---|---|---|---|
| 7 | 4.0 | 4.0 | 1.0 | 4.5 | 0.05 | 55 | 35 | 27 |
| 8 | 4.0 | 4.0 | 1.0 | 4.5 | 0.05 | 55 | 38 | 27 |
| 9 | 4.0 | 4.0 | 1.0 | 4.5 | 0.05 | 55 | 32 | 19 |
| 10 | 4.0 | 4.0 | 1.0 | 4.5 | 0.05 | 55 | 38 | 29 |

*Examples 11, 12, 13, 14 and 15*

The general method of polymerization of propylene described in the foregoing examples was used in the following. All of the bottles were vented for one minute after charging the propylene to remove nitrogen. This procedure caused some of the bottles to be under a negative pressure at completion.

A 27-percent dispersion in 50/50 mineral oil B/petrolatum B was used in Examples 11 and 12. The particle size of this dispersion was about 5 microns.

A 27-percent sodium dispersion in 50/50 mineral oil B/petrolatum A was used in Examples 13, 14 and 15. The particle size of this dispersion was about 2 microns.

Both dispersions were diluted to 2 molar in mineral oil. The following table gives the amount of each of the several additives employed in the polymerization of 50 grams of propylene, and the progress of the drop in pressure within the reactor.

TABLE V

| Example | mM. H₂ | mM. AA | mM. TDSI | mM. Na | mM. Et₂Zn | Initial, p.s.i.g. | 3 Hr., p.s.i.g. | 22 Hr., p.s.i.g. |
|---|---|---|---|---|---|---|---|---|
| 11 | 5.3 | 4.0 | 1.0 | 4.5 | 0.05 | 57 | 38 | 2 |
| 12 | 5.3 | 4.0 | 1.0 | 3.0 | 0.05 | 61 | 43 | 9 |
| 13 | 5.3 | 4.0 | 1.0 | 4.5 | 0.05 | 60 | 38 | 0 |
| 14 | 5.4 | 4.0 | 1.0 | 3.0 | 0.05 | 61 | 34 | −4 |
| 15 | 5.4 | 3.0 | 1.0 | 2.0 | 0.05 | 60 | 41 | 3 |

From a comparison of Examples 11 and 12 and Examples 13 and 14 of Table V, it can readily be seen that the smaller particle size obtained with the 50/50 mineral oil B/petrolatum A dispersion used in Examples 13 and 14 increases both the rate and conversion of the polymerization. Furthermore, it is noted that with the sodium of larger particle size, as in Examples 11 and 12, a reduction in the amount of sodium decreased the rate of reaction so that after 22 hours the pressure was reduced to 9 p.s.i.g. only. However, with sodium of smaller particle size, the smaller amount of sodium reacted at a higher rate as evidenced by the reduction to −4 p.s.i.g.

From Example 15, it is apparent that because of the higher rate of reaction with the sodium of smaller particle size, less AA (a very expensive reactant) can be used.

Examples 16 and 17

These examples are typical polymerizations of butadiene dissolved in hexane and catalyzed with a 27-percent sodium dispersion prepared in a 50–50 blend of mineral oil B and petroleum A. The particles size of this dispersion was approximately 2 microns. After 18 hours at 50° C. the polymerization had gone to completion. A brownish-red low-viscosity solution of polymer formed in good yield. This polymerization is superior to similar polymerizations with sodium in other media in that there was a shorter initiation period and the polymer thus obtained was of lower viscosity, indicating that all of the sodium, or practically all of the sodium had reacted.

The petroleum-mineral oil dispersions of sodium may be used in continuous processes of polymerization, as well as in batch operations.

What I claim is:

1. The improvement in the dispersion polymerization of hydrocarbon olefinic monomer by a catalyst system which includes sodium, tetrakis(dimethylamino)silane and Ti₃AlCl₁₂, which method comprises dispersing the sodium in a blend of 25 to 75 percent (by weight) of a light mineral oil and 75 to 25 percent of petrolatum, and then polymerizing the monomer with a catalyst system comprising said dispersed sodium with dispersed tetrakis(dimethylamino)silane and Ti₃AlCl₁₂.

2. The process of claim 1 in which the monomer is propylene.

3. The process of claim 1 in which the monomer is butadiene.

References Cited by the Examiner

UNITED STATES PATENTS

| 2,058,131 | 10/1936 | Carlisle | 208—294 |
| 2,614,966 | 10/1952 | Vanderbilt | 208—294 |
| 2,818,350 | 12/1957 | Kavanagh | 252—475 |
| 3,053,916 | 9/1962 | Wilson et al. | 260—683.15 |

FOREIGN PATENTS 759,283  10/1956  Great Britain.

DELBERT E. GANTZ, *Primary Examiner.*

R. H. SHUBERT, *Assistant Examiner.*

PO-1050
(5/69)

UNITED STATES PATENT OFFICE
CERTIFICATE OF CORRECTION

Patent No. 3,265,759            Dated August 9, 1966

Inventor(s) Alfred R. Cain

It is certified that error appears in the above-identified patent and that said Letters Patent are hereby corrected as shown below:

Column 1, line 72, "ont" should read --not--;

Column 2, line 18, "Viscometer" should read --viscosimeter--;

Column 5, line 33, "Petroleum" should read --Petrolatum--;

Column 6, line 1, "petroleum" should read --petrolatum--.

SIGNED AND
SEALED
MAR 10 1970

(SEAL)
Attest:

Edward M. Fletcher, Jr.
Attesting Officer

WILLIAM E. SCHUYLER, JR.
Commissioner of Patents